(12) United States Patent
Ang

(10) Patent No.: US 6,892,005 B2
(45) Date of Patent: May 10, 2005

(54) LOW LOSS INTEGRATED OPTIC SWITCH

(75) Inventor: Dick Ang, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 370 days.

(21) Appl. No.: 09/993,528

(22) Filed: Nov. 14, 2001

(65) Prior Publication Data

US 2003/0091288 A1 May 15, 2003

(51) Int. Cl.[7] ............................................. G02B 6/26
(52) U.S. Cl. ......................................... 385/41; 385/40
(58) Field of Search ............................... 385/39–41, 16

(56) References Cited

U.S. PATENT DOCUMENTS

| | | | | |
|---|---|---|---|---|
| 4,035,058 A | * | 7/1977 | Papuchon | 385/40 |
| 4,787,689 A | * | 11/1988 | Korotky et al. | 385/130 |
| 4,798,429 A | * | 1/1989 | Djupsjobacka | 385/24 |
| 4,997,245 A | * | 3/1991 | DuPuy et al. | 385/16 |
| 5,148,507 A | * | 9/1992 | Tanisawa | 385/41 |
| 5,247,268 A | | 9/1993 | Meise | |
| 5,526,439 A | * | 6/1996 | Bergmann | 385/24 |
| 5,687,260 A | | 11/1997 | Liedenbaum | |
| 5,845,025 A | | 12/1998 | Garito et al. | |
| 6,033,126 A | | 3/2000 | Omori et al. | |
| 6,081,634 A | | 6/2000 | Attard | |

FOREIGN PATENT DOCUMENTS

JP  06235836 A  *  8/1994

* cited by examiner

Primary Examiner—Ellen E. Kim

(57) ABSTRACT

An integrated optical switch that has a low throughput loss during the "on" pulse, and a high throughput loss during the "off" period. The optical switch includes a substrate with at least two waveguide structures suitably formed on the substrate. One of the waveguide structures is substantially straight and connects an input port to an output port. During an "on" pulse, light may be guided along the substantially straight waveguide from the input port to the output port such that there is little throughput loss. During an "off" period, a voltage is applied across control electrodes such that the waveguides are coupled so that light does not reach the output port.

24 Claims, 5 Drawing Sheets

LOW LOSS INTEGRATED OPTIC SWITCH

TECHNICAL FIELD OF THE INVENTION

The present invention relates generally to optical switches, and more particularly, to a low loss integrated optical switch.

BACKGROUND OF THE INVENTION

Active and passive devices employing optical waveguide structures for use in communication applications are well known in the art. Integrated optical structures involve the monolithic integration of one or more optical waveguide structures on a common substrate. Optical waveguide structures include modulators and switches that typically use laser diode optical sources and that transmit light (i.e., an optical signal) along an optical fiber. An example of a passive structure is a fixed optical power splitter, while an example of an active structure is an optical switch.

A single substrate may include a plurality of optical waveguide structures and integrated optical directional couplers. An integrated optical directional coupler is formed when two optical waveguides are situated such that their evanescent mode fields overlap. The distance between the two waveguides is decreased by using curved waveguides, such as "C-shaped" waveguides, that have symmetric bends, whereby each of the waveguides "bends" toward the other. The two waveguides are used to confine and guide the optical signal from an input port to an output port.

A typical configuration of an optical directional coupler has two input ports and two output ports. In this manner, light can be guided from either of the two input ports to either of the two output ports. The directional coupler can operate as a straight through switch or as a cross-over switch. When the directional coupler is activated, the selected input port and the selected output port are "coupled" so that the light received at the input port is routed to the appropriate output port.

Many applications have a requirement for a high gain optical amplifier or Q switched laser that can sustain high power pulses of short duration. In order to meet this requirement, an optical switch with very low optical throughput loss during the "on" pulse is needed.

In a conventional directional coupler acting as an optical switch, light is lost due to the bend in the waveguides. Optical loss can be high even when the directional coupler acts as a straight through switch. Typical throughput loss is between three to four dB, and can be even higher.

A low loss integrated optical switch is thus needed which overcomes one or more of the shortcomings of the prior art.

BRIEF SUMMARY OF THE INVENTION

A low loss integrated optical switch in accordance with the present invention comprises optical waveguides formed on a substrate. One of the waveguides is substantially straight and connects an input port to an output port such that light is guided along the waveguide, with little throughput loss, between the ports. A second waveguide is formed in proximity to the substantially straight waveguide such that a directional coupler may be formed between the two waveguides.

BRIEF DESCRIPTION OF THE SEVERAL VIEWS OF THE DRAWINGS

A more complete understanding of the present invention may be derived from the detailed description and claims when considered in connection with the following illustrative Figures, which may not be to scale. In the following Figures, like reference numbers refer to similar elements throughout the Figures.

DETAILED DESCRIPTION OF PREFERRED EXEMPLARY EMBODIMENTS

Figure 1:
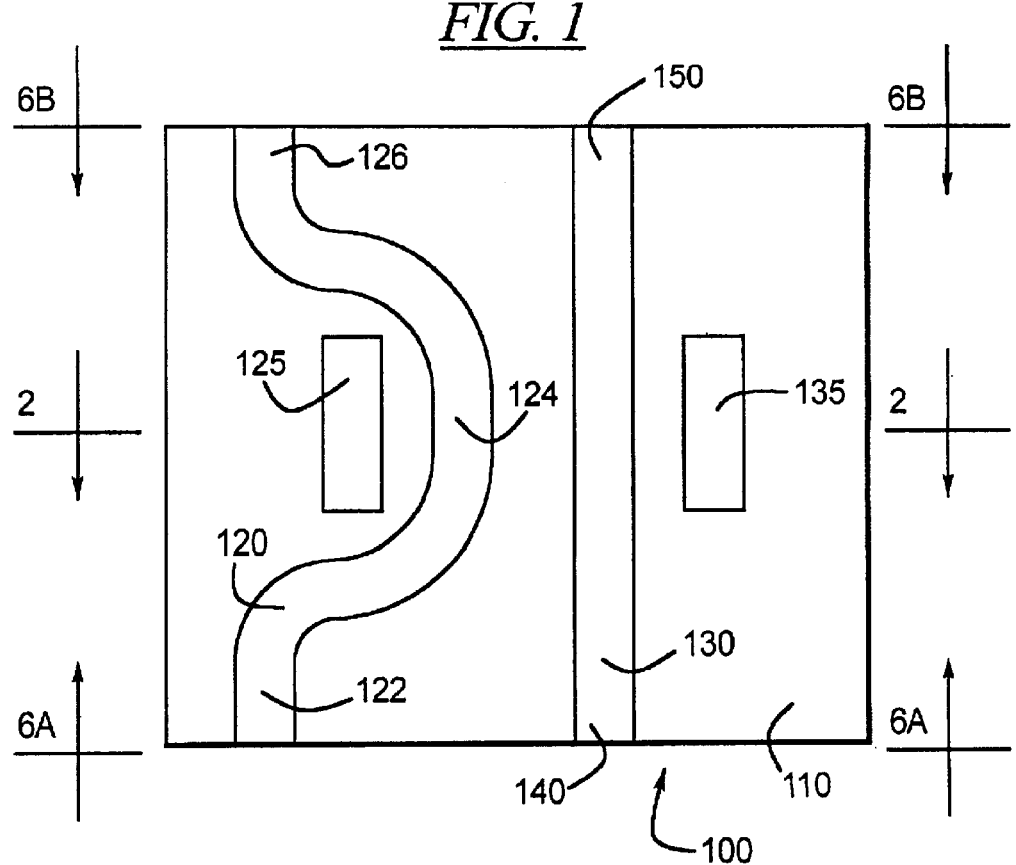
FIG. 1 illustrates, in top view, an optical switch in accordance with the present invention.
Figure 2:
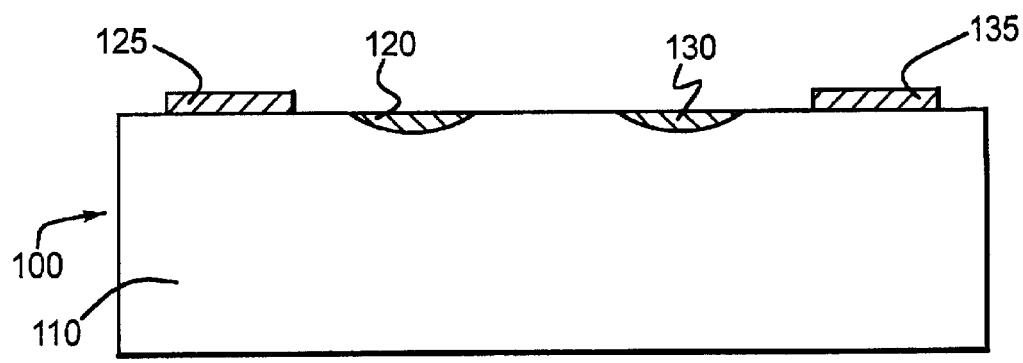
FIG. 2 illustrates, in cross-section, the optical switch of FIG. 1.

The present invention may be described herein in terms of various hardware components and processing steps. It should be appreciated that such components may be realized by any number of hardware components configured to perform the specified functions. For example, the present invention may employ various hardware components, e.g., electrodes, optical fibers, and the like, which may carry out a variety of functions under the control of one or more microprocessors or other control devices. In addition, those skilled in the art will appreciate that the present invention may be practiced in any number of communication contexts and that the preferred embodiment described herein is merely one exemplary application for the invention. Accordingly, the present invention is not limited to the process flows described herein, as any process flow or rearrangement of process steps which captures the features of the present invention is considered to be within the scope of the present invention. Further, it should be noted that the present invention may employ any number of conventional techniques for processing steps such as photolithography, and the like. Such general techniques that may be known to those skilled in the art are not described in detail herein.

It should be appreciated that the particular implementations shown and described herein are merely illustrative and are not intended to limit the scope of the present invention in any way. Indeed, for the sake of brevity, conventional processing techniques may not be described in detail herein. For example, the process of photolithographic patterning and etching is used herein in describing certain process steps in the present invention, but the process of photolithography itself, as carried out in the present invention, is not described in detail. The photolithography process includes creating a photomask containing the pattern of the component to be formed on a substrate, coating the substrate with a radiation-sensitive compound also known as a photoresist, exposing the photoresist layer to ultraviolet radiation through the mask, removing the softened portions of the photoresist, etching to remove the material left unprotected by the photoresist, and stripping off the remaining photoresist. Those skilled in the art will understand this as the process that occurs when a photolithographic step is included when describing the present invention.

As previously discussed above, a need exists for an optical switch that has a low throughput loss during the "on"

pulse, and a high loss during the "off" period. During the off period, there is no requirement for using the light, so it is desirable that light does not pass through the optical switch (i.e., high optical throughput loss is created) to any optical fiber or similar structure that may be attached to the output side of the optical switch. In accordance with the present invention, an optical switch is suitably configured to provide low optical throughput loss during an on pulse and high optical throughput loss during an off period.

In accordance with an exemplary embodiment of the present invention, with reference to FIG. 1, a low-loss optical switch 100 is illustrated. Optical switch 100 is an integrated optical device that includes a substrate 110 underlying waveguide structures 120 and 130. The substrate 110 is suitably fabricated from a material such as the widely available synthetic crystal, lithium niobate (LiNbO3), or lithium tantalate, or any other substrate material suitable for constructing optical waveguides. The optical switch 100 further comprises control electrodes 125 and 135.

The waveguide structures 120 and 130 may be formed by a titanium indiffusion process or by proton exchange as further described below. The material of the substrate 110 is determined according to the specific process that is used to form the waveguide. For example, waveguides produced by titanium indiffusion comprise photolithographically patterned lines of titanium. Alternatively, the waveguide structures 120 and 130 may be formed by a proton exchange process that replaces lithium ions in the substrate 110 with hydrogen ions. This process produces waveguide structures with an increased refractive index, as compared to the surrounding substrate. In either configuration, the substrate 110 has an index of refraction lower than that of the waveguides 120 and 130, so that light does not escape the waveguides 120 and 130 but rather propagates through them. The thicknesses of the waveguides 120 and 130 may vary depending on the application, but an exemplary waveguide thickness is approximately 5 to 10 microns. The two waveguide structures of the optical switch 100 are located close enough to each other that the two waveguides evanescently couple to form a directional coupler.

The control electrodes 125 and 135 may comprise a metallic material such as chrome/gold, chrome/aluminum, or any other suitable material. The size of the control electrodes 125 and 135 may vary depending on the application, but exemplary sizes are approximately 5 to 15 mm for the length and approximately 10 to 50 microns for the width of the electrode.

As shown in FIG. 1, the waveguide 130 further comprises an input port 140 located at one end of the optical switch 100 and an output port 150 located at the other end of the optical switch 100. The waveguide 130 is shaped in a substantially straight line that extends from the input port 140 to the output port 150. As will be described in detail later, an input optical fiber may be coupled to the input port 140 and an output optical fiber may be coupled to the output port 150. In this manner, the waveguide 130 may be used to guide light from the input port 140 to the output port 150.

The waveguide 120 has a first substantially straight section 122, a "C-shaped" section 124, and a second substantially straight section 126. The "C-shaped" section 124 is formed in proximity to the waveguide 130 such that the waveguides 120 and 130 evanescently couple to form a directional coupler. The separation between the waveguides 120 and 130 may vary depending on the application, but an exemplary waveguide separation may be approximately 30 to 60 microns. The intention of the separation is to form a switch such that light can be diverted through or away from the waveguide 130.

The control electrode 125 is formed proximate to the "C-shaped" section 124 of the waveguide 120 on the side of the waveguide 120 that is away from the waveguide 130. Thus, the control electrode 125 is located such that the "C-shaped" section 124 extends around the control electrode 125. The control electrode 135 is formed proximate to the waveguide 130 on the side of the waveguide 130 that is away from the waveguide 120, at approximately the same position as the control electrode 125.

Figure 3A:
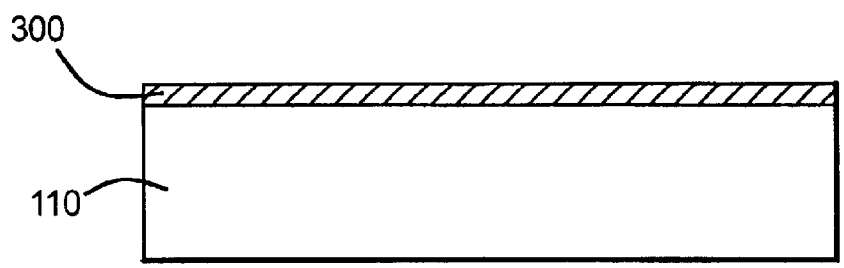
FIGS. 3A–3F illustrate, in cross-sections, the optical switch of FIG. 1 in various stages of an indiffusion process.
Figure 3B:
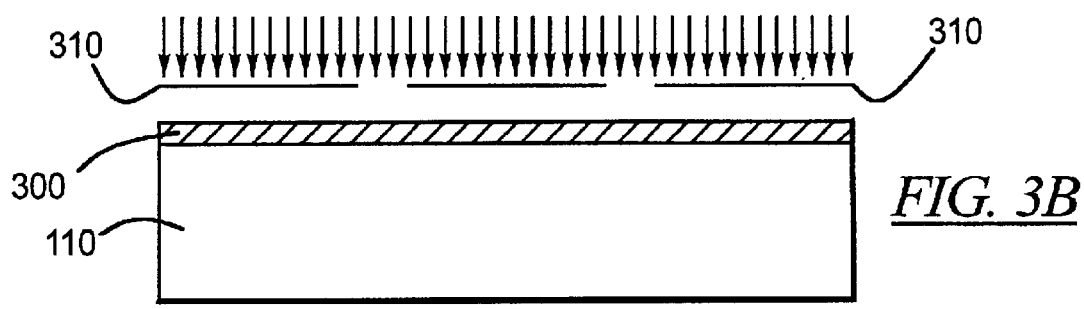

As shown in FIGS. 3A–3F, the optical waveguides 120 and 130 may be formed by photolithographically patterned lines of titanium (Ti) that are formed on the substrate 110 by a titanium indiffusion process. First, the substrate 110 may be cleaned and then coated with a photoresist 300 as illustrated in FIG. 3A. The coated substrate is exposed using a chrome mask 310 that is illuminated by ultraviolet (UV) radiation (FIG. 3B). The chrome mask 310 may be formed using standard computer-aided (CAD) techniques, such as those used in the semiconductor industry, by using a variety of equipment such as step-and-repeat or E-beam systems. The chrome mask 310 is a mask that corresponds to the desired locations of the optical waveguides 120 and 130.

Figure 3C:
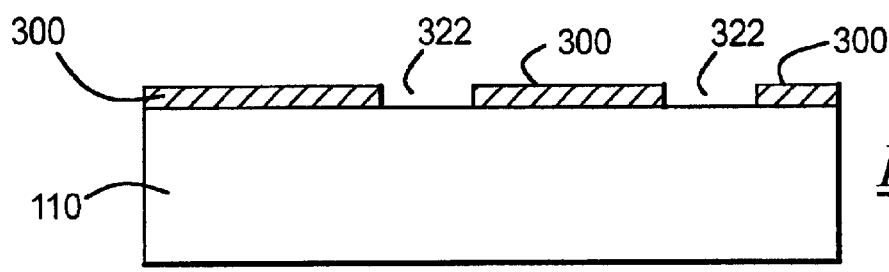
Figure 3D:
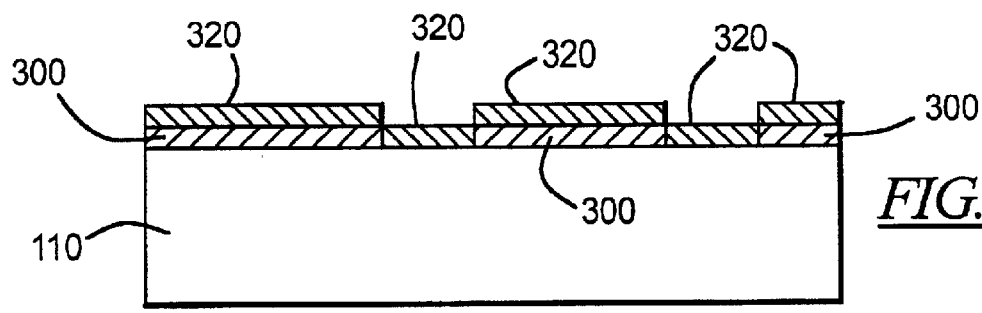
Figure 3E:
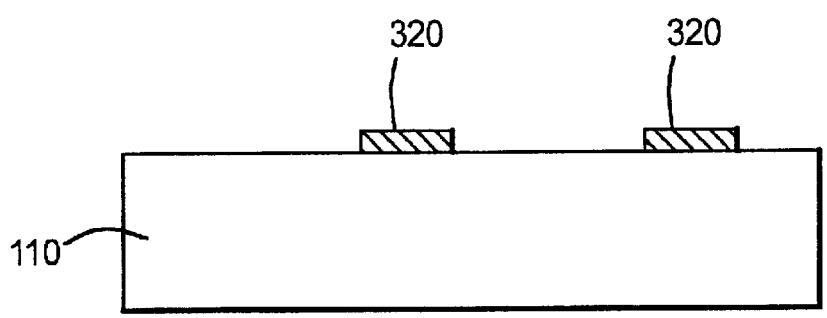
Figure 3F:
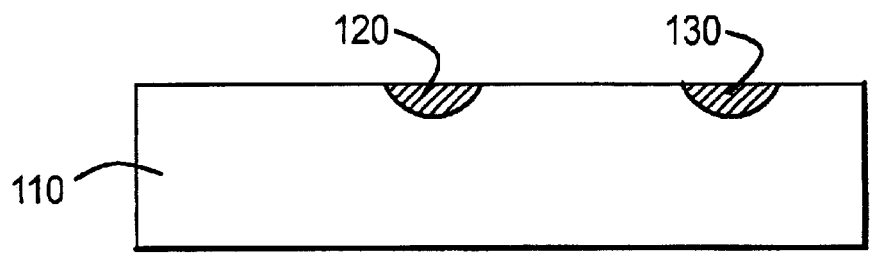

The photoresist 300 is then developed to expose unmasked areas 322 of the substrate 110 that correspond to the desired locations of the optical waveguides 120 and 130 (FIG. 3C). As illustrated in FIG. 3D, the exposed areas may be removed and the patterned substrate coated with titanium 320 using equipment such as a vacuum evaporator. The titanium 320 covers the exposed regions of the substrate 110 as well as the surface of the remaining photoresist 300. As illustrated in FIG. 3E, the substrate 110 is soaked in a photoresist solvent which causes the residual photoresist 300, including the titanium 320 on top of the photoresist 300, to be removed, leaving only the titanium that coated the bare regions of the substrate 110. The photolithographed lines of titanium may be several hundred angstroms thick. As illustrated in FIG. 3F, the titanium 320 is then diffused into the substrate 110 at a high temperature, for example 1000 degrees Celsius or higher, for several hours. This diffusion process raises the refraction index in the areas where the titanium has diffused, forming high-refractive index stripes in the form of the waveguides 120 and 130 that will confine and guide light.

Figure 4A:
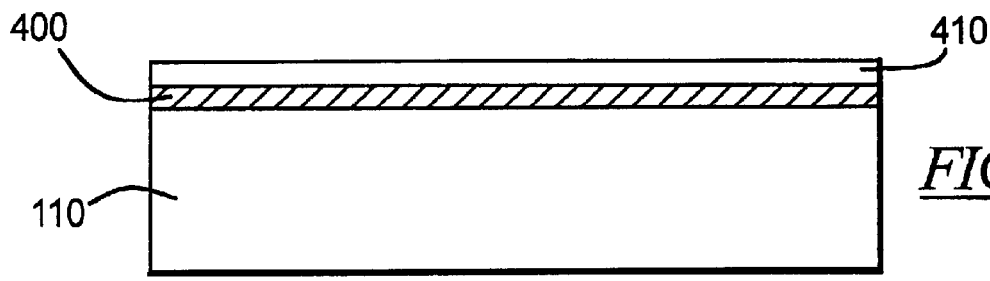
FIGS. 4A–4F illustrate, in cross-sections, the optical switch of FIG. 1 in various stages of a proton exchange process.
Figure 4B:
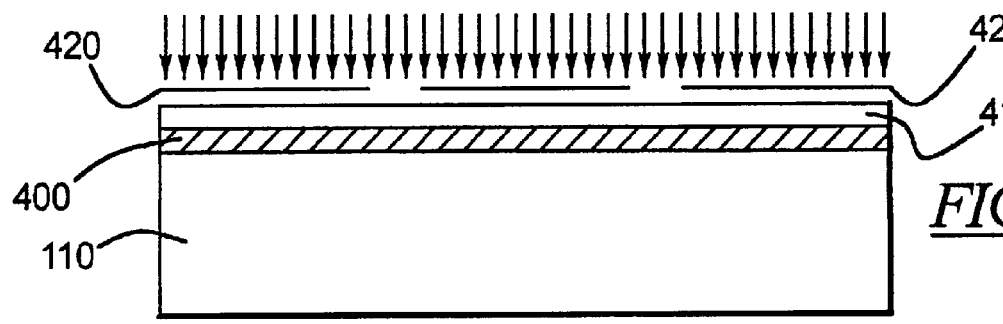

Alternatively, the optical waveguides 120 and 130 may be formed by using a proton exchange technique. As shown in FIGS. 4A–4F, a chrome layer 400 and a photoresist layer 410 are first deposited on a substrate 110 (FIG. 4A). Next, the coated substrate is exposed using a chrome mask 420 that is illuminated by ultraviolet (UV) radiation (FIG. 4B). As noted above, the chrome mask 420 may be formed using standard computer-aided (CAD) techniques, such as those used in the semiconductor industry. The chrome mask 420 is a mask that contains the desired locations of the optical waveguides 120 and 130.

Figure 4C:
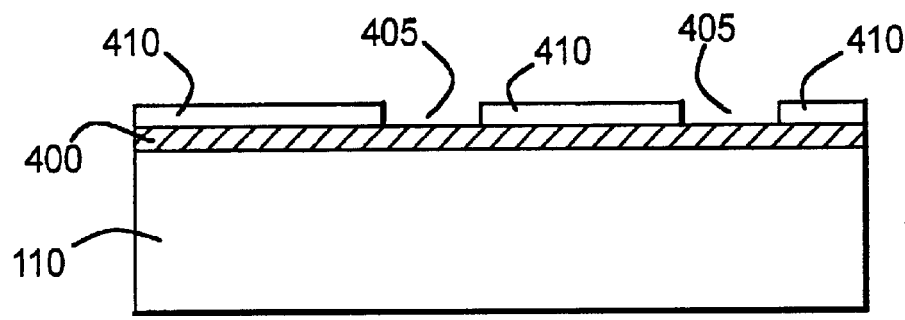
Figure 4D:
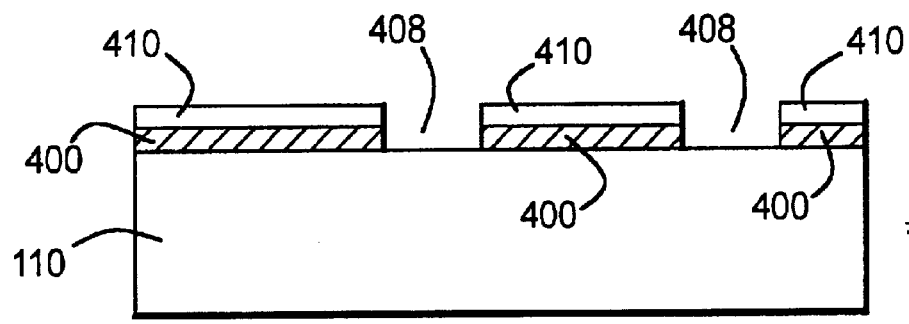
Figure 4E:
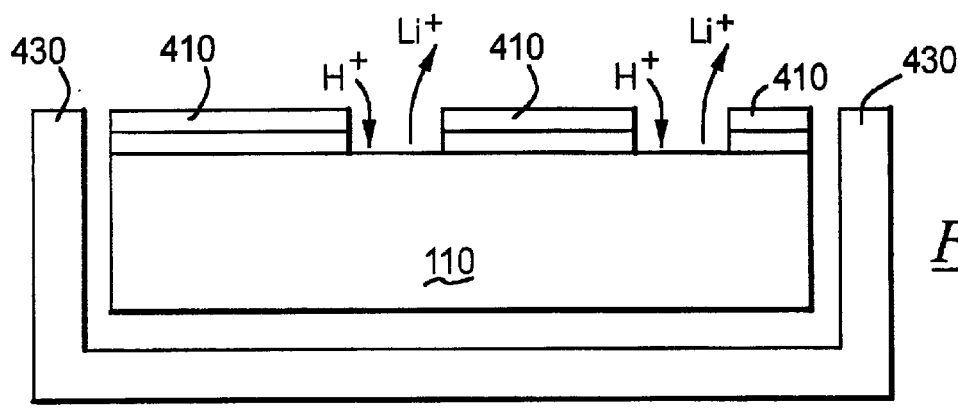
Figure 4F:
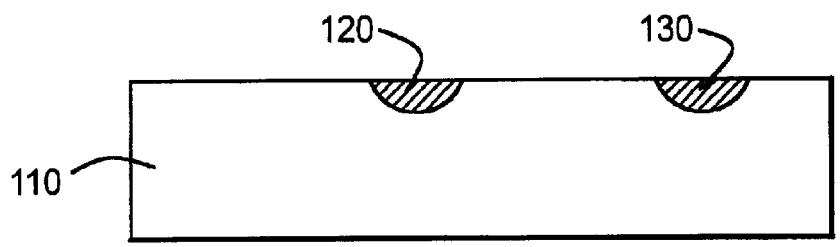

Next, the photoresist 410 is developed to expose unmasked areas 405 of the chrome layer 400 that correspond to the desired locations of the optical waveguides 120 and 130 (FIG. 4C). The exposed chrome areas are etched away as illustrated in FIG. 4D to define to define regions 408 of the substrate 110. Hydrogen ions are exchanged for lithium ions by submerging of the substrate 110 in hot benzoic acid 430 (FIG. 4E). The exchange of hydrogen ions for lithium ions results in an increase in the refractive index for those defined regions. This exchange process can take place at lower temperatures than the titanium diffusion. For example, this exchange process can take place at temperatures such as 200–250 degrees Celsius. After the substrate 110 is submerged in hot benzoic acid 430, the chrome 400 and the photoresist 410 are removed. The substrate 110 is annealed at a higher temperature, such as 350–400 degrees Celsius. The regions 408 exposed to the benzoic acid have an increased refractive index to thus define the waveguides 120 and 130.

Figure 5A:
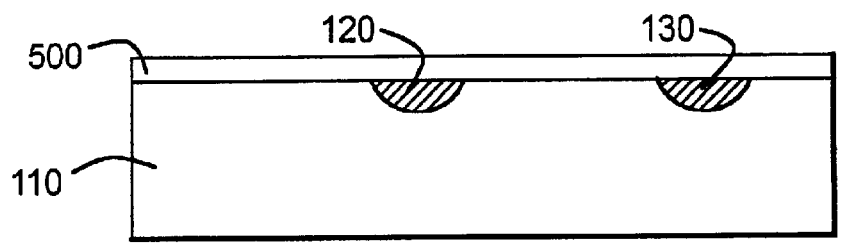
FIGS. 5A–5E illustrate, in cross-sections, the optical switch of FIG. 1 in various states of the manufacturing process for electrodes; and, FIGS. 6A and 6B illustrate, in side views, the optical switch of FIG. 1.
Figure 5B:
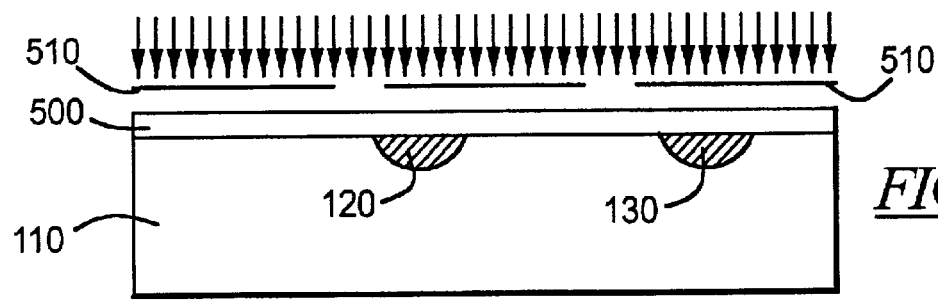

The electrodes 125 and 135 are formed in a similar process. That is, the substrate 110 containing the waveguides 120 and 130 may be first coated with a photoresist 500 as illustrated in FIG. 5A. Next, the coated substrate is exposed using an electrode mask 510 that is illuminated by ultraviolet (UV) radiation (FIG. 5B). The electrode mask 510 may be formed using standard computer-aided (CAD) techniques, such as those used in the semiconductor industry. The electrode mask 510 defines the desired locations of the electrodes 125 and 135.

Figure 5C:
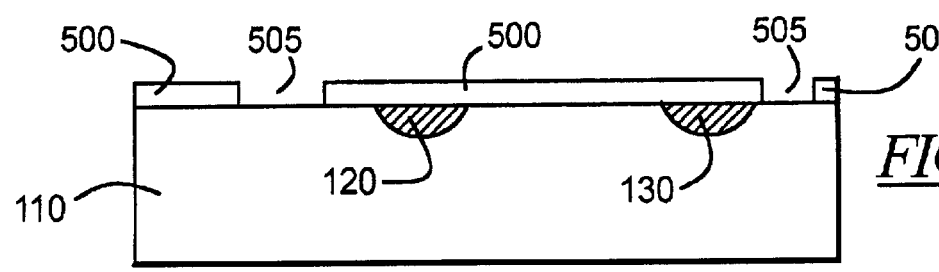
Figure 5D:
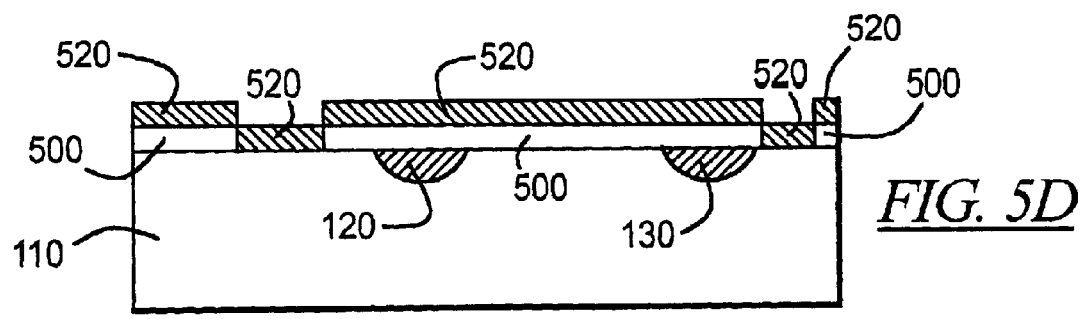
Figure 5E:
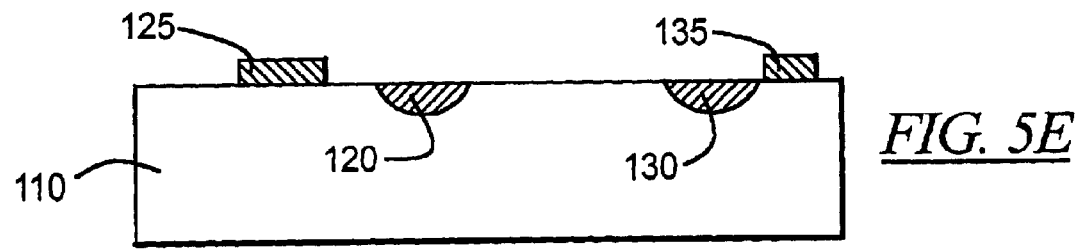

Next, the photoresist 500 is developed to expose unmasked areas 505 of the substrate 110 that correspond to the desired locations of the electrodes 125 and 135 (FIG. 5C). The patterned substrate is now coated with a metal 520 such as chrome/gold or chrome/aluminum or any other suitable metal that may used to form electrodes (FIG. 5D). The metal 520 may be applied to the substrate 110 using equipment such as a vacuum evaporator. The metal 520 covers the exposed regions of the substrate 110 as well as the surface of the remaining photoresist 500. Next, the substrate 110 is soaked in a photoresist solvent which causes the residual photoresist 500; including the metal 520 on top of the photoresist 500, to be removed, leaving only the metal 520 that coats the bare regions of the substrate 110 (FIG. 5E). The remaining metal 520 forms the desired electrodes 125 and 135.

Figure 6A:
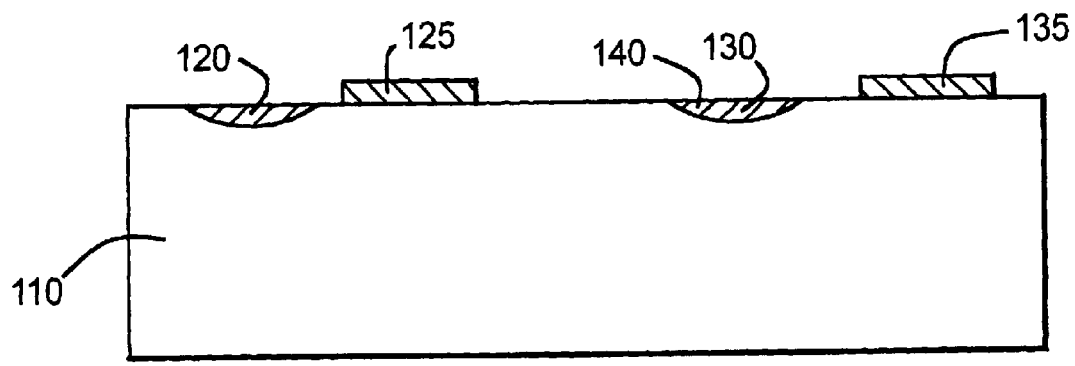
Figure 6B:
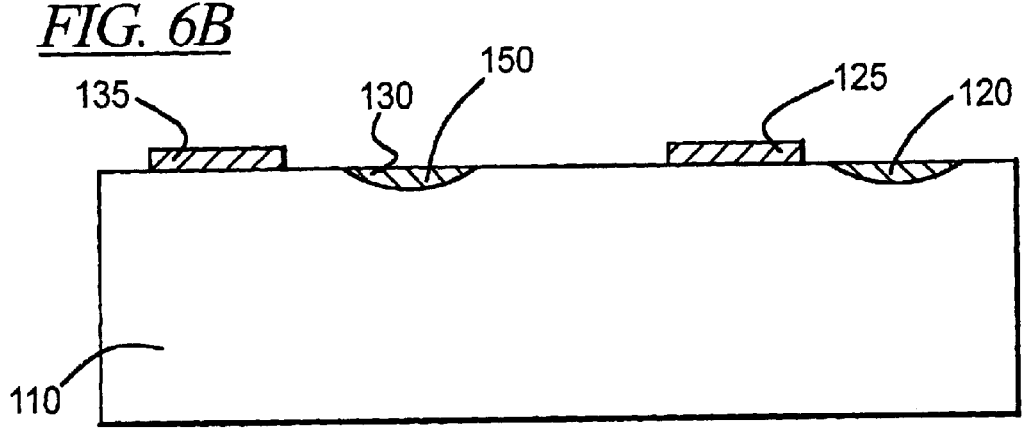

As shown in FIGS. 6A and 6B, endfaces or input and output ports 140 and 150 may be lapped and polished flat into optical windows in order for light to enter and exit the waveguide 130. One technique for forming optical windows includes polishing the entire endface of substrate 110 to a sharp corner, making the whole endface into an optical window. An optical fiber can then be aligned to the end of the waveguide 130 and attached in accordance with various known techniques such as prism coupling, grating coupling, end-fire coupling with lenses, and end-fire coupling with optical fibers. These techniques are well-known in the field and will not be described in detail herein.

In operation, an input optical fiber is operatively connected to one end of the waveguide 130 at the input port 140. An output optical fiber is also operatively connected to the other end of the waveguide 130 at the output port 150. Once the optical fibers are in place, light provided by the input optical fiber can be selectively directed to the output port 150 during an "on" pulse, and the light can be leaked out of the waveguide 130 during an "off" state such that light does not reach the output port 150.

Normally, light will pass from the input port 140 to the output port 150 guided by the waveguide 130. It will be appreciated that the throughput loss of light guided by the waveguide 130 will be low because the waveguide 130 is substantially straight, and therefore, there is no throughput loss due to a bend in the waveguide.

When the proper voltage is provided across the electrodes 125 and 135, the refractive index in the waveguide 130 is changed in the area of the electrode 135, thus causing a coupling between the waveguides 120 and 130 proximate to "C-shaped" section 124. This coupling allows the light in the waveguide 130 to couple into the waveguide 120 and, therefore, light will leak out of the waveguide 130. It will be appreciated that this operation results in an "off" state whereby light does not reach the output port 150.

The present invention has been described above with reference to a preferred embodiment. However, those skilled in the art will recognize that changes and modifications may be made to the preferred embodiment without departing from the scope of the present invention. For example, the various processing steps of forming the waveguide structures may be implemented in alternative ways depending upon the particular application, or in consideration of any number of cost functions associated with the operation of the system. In addition, the techniques described herein may be extended or modified for use with various other applications, such as, for example, telecommunications, instrumentation, signal processing, and various types of sensors such as voltage sensors and rotation sensors. These and other changes or modifications are intended to be included within the scope of the present invention.

What is claimed is:

1. An integrated optical switch for coupling an input optical fiber to an output optical fiber, comprising:
   a substrate;
   a first waveguide formed on the substrate;
   a second waveguide formed on the substrate;
   an input port located at one end of the second waveguide for operatively receiving the input optical fiber;
   an output port located at the other end of the second waveguide for operatively receiving the output optical fiber;
   a first control electrode positioned proximate the first waveguide;
   a second control electrode positioned proximate the second waveguide;
   wherein the second waveguide is substantially straight; and,
   wherein the first waveguide has a bend proximate to the second waveguide such that a directional coupler is formed and wherein the first waveguide has a first end and a second end on the same sides of the substrate as the input port and the output port of the second waveguide respectively, and wherein the first and second waveguides are formed between the first and second control electrodes.

2. The optical switch of claim 1 wherein the substrate comprises lithium niobate.

3. The optical switch of claim 1 wherein the substrate comprises lithium tantalate.

4. The optical switch of claim 1 wherein the first and second waveguides comprise titanium diffused into the substrate.

5. The optical switch of claim 1 wherein the first and second waveguides are formed by a proton exchange process.

6. A directional coupler for coupling an input optical fiber to an output optical fiber, comprising:
   a substrate;
   a first waveguide formed op the substrate, wherein the first waveguide is substantially straight;
   a second waveguide formed on the substrate, wherein the second waveguide has a bend proximate to the first waveguide such that the first and second waveguides evanescently couple;

an input port located at one end of the first waveguide for operatively receiving the input optical fiber;

an output port located at the other end of the first waveguide for operatively receiving the output optical fiber;

a first control electrode positioned proximate the first waveguide; and, a second control electrode positioned proximate the second waveguide, wherein the first waveguide has a first end and a second end on the same sides of the substrate as the input port and the output port of the second waveguide respectively, and wherein the first and second waveguides are formed between the first and second control electrodes.

7. The directional coupler of claim 6 wherein the second control electrode is formed proximate to the bend in the second waveguide.

8. The directional coupler of claim 7 wherein the first and second waveguides are formed between the first and second control electrodes.

9. The directional coupler of claim 6 wherein the bend is in closer proximity to the first waveguide than is the remainder of the second waveguide.

10. The directional coupler of claim 6 wherein the substrate comprises lithium niobate.

11. The directional coupler of claim 6 wherein the substrate comprises lithium tantalate.

12. The directional coupler of claim 6 wherein the first and second waveguides comprise titanium diffused into the substrate.

13. The directional coupler of claim 6 wherein the first and second waveguides are formed by a proton exchange process.

14. An optical switch comprising:

a substrate;

a first waveguide formed on the substrate, wherein the first waveguide is substantially straight;

a second waveguide formed on the substrate, wherein the second waveguide has a bend such that the bend of the second waveguide is proximate to the first waveguide;

an input port located at one end of the first waveguide;

an output port located at the other end of the first waveguide;

a first control electrode formed on the substrate and located proximate to the first waveguide; and, a second control electrode positioned formed on the substrate and located proximate the second waveguide, wherein the first waveguide has a first end and a second end on the same sides of the substrate as the input port and the output port of the second waveguide respectively, and wherein the first and second waveguides are formed between the first and second control electrodes.

15. The directional coupler of claim 14 wherein the second control electrode is formed proximate to the bend in the second waveguide.

16. The directional coupler of claim 14 wherein the bend is in closer proximity to the first waveguide than is the remainder of the second waveguide.

17. The directional coupler of claim 14 wherein the substrate comprises lithium niobate.

18. The directional coupler of claim 14 wherein the substrate comprises lithium tantalite.

19. The directional coupler of claim 14 wherein the first and second waveguides comprise titanium diffused into the substrate.

20. The directional coupler of claim 14 wherein the first and second waveguides are formed by a proton exchange process.

21. The directional coupler of claim 14 wherein the bend comprises a C-shaped bend in the second waveguide, and wherein the C-shaped bend wraps around the second control electrode.

22. The directional coupler of claim 14 wherein the bend is in closer proximity to the first waveguide than is the remainder of the second waveguide.

23. An integrated optical switch for coupling an input optical fiber to an output optical fiber, comprising:

a substrate having a first edge and a second edge;

a first waveguide formed on the substrate;

a second waveguide formed on the substrate;

an input port located at one end of the second waveguide at the first edge of the substrate for operatively receiving the input optical fiber;

an output port located at the other end of the second waveguide at the second edge of the substrate for operatively receiving the output optical fiber;

a first control electrode positioned proximate the first waveguide;

a second control electrode positioned proximate the second waveguide;

wherein the second waveguide is substantially straight; and, wherein the first waveguide has a bend proximate to the second waveguide such that a directional coupler is formed and wherein the first waveguide has a first end at the first edge of the substrate and a second end at the second edge of the substrate, and wherein the first and second waveguides are formed between the first and second control electrodes.

24. An integrated optical switch for coupling an input optical fiber to an output optical fiber, comprising:

a substrate;

a first waveguide formed by a proton exchange process on the substrate;

a second waveguide formed by a proton exchange process on the substrate;

an input port located at one end of the second waveguide for operatively receiving the input optical fiber;

an output port located at the other end of the second waveguide for operatively receiving the output optical fiber;

a first control electrode positioned proximate the first waveguide;

a second control electrode positioned proximate the second waveguide;

wherein the second waveguide is substantially straight; and, wherein the first waveguide has a bend proximate to the second waveguide such that a directional coupler is formed, and wherein the first and second waveguides are formed between the first and second control electrodes.

* * * * *